Patented June 27, 1950

2,513,190

UNITED STATES PATENT OFFICE 2,513,190

POLYMERIC COLOR FORMERS

David Malcolm McQueen, Wilmington, Del., assignor to E. I. du Pont de Nemours & Company, Wilmington, Del., a corporation of Delaware No Drawing. Application February 18, 1948, Serial No. 9,330

5 Claims. (Cl. 260—73)

This invention relates to new acetals of vinyl alcohol polymers and more particularly to acetals of polyvinyl alcohol and m-benzoylacetamidobenzaldehydes.

An object of this invention is to provide new polymeric dye intermediates or color formers. A more specific object is to provide new polyvinyl acetal color formers. A further object is to provide such color formers which have improved colloid binding properties for light-sensitive silver halide grains. Still other objects will be apparent from the following description of the invention.

The novel acetals of polyvinyl alcohol and m-benzoylacetamidobenzaldehydes which are provided by this invention may be represented by the following structural formula of the color former units:

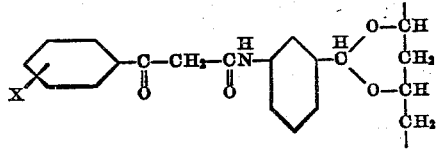

wherein X is a hydrogen, chlorine or bromine atom or a —CH₃, —OCH₃, —COOC₂H₅, or —COOH group. These groups are common in color formers and do not interfere with color coupling reactions whereby azomethine dyes are formed by interaction with the active methylene group. The free bonds are attached to intralinear carbon atoms in the chain of carbon atoms which formed the original vinyl alcohol polymer.

The polyvinyl acetals just described can be prepared by reacting a vinyl alcohol polymer containing a large number of recurring intralinear

groups with a m-benzoylacetamidobenzaldehyde or a lower acetal thereof with an alkanol of one to four carbon atoms or a 1,2- or a 1,3-alkanediol or glycol of two to four carbon atoms in the presence of an acidic condensation catalyst. The m-benzoylacetamidobenzaldehydes and their acetals just described may be prepared after the manner described in copending application Serial Number 667,126, filed May 3, 1946, now Patent No. 2,464,597, March 15, 1949, of which the present application is a continuation-in-part, by reacting ethyl benzoylacetate or a similar ester of a one to three carbon alkanol in an inert, high-boiling solvent, e. g., chlorobenzene or xylene, and a small amount of an alkaline catalyst, e. g., pyridine or 20% aqueous KOH, with a lower acetal of a m-aminobenzaldehyde, e. g., the ethylene glycol acetal. The m-aminobenzaldehyde acetal is preferably added after the components are heated to a temperature of 100° C. to 140° C. The ethyl alcohol released in the condensation reaction is distilled out of the mixture over a period of two to four hours. After cooling, the reaction mixture is poured into water containing a sufficient amount of sodium hydroxide to dissolve the m-benzoylacetamidobenzaldehyde acetal. The water layer is separated, washed with a water-immiscible solvent, such as ether, and saturated with carbon dioxide. The m-benzoylacetamidobenzaldehyde acetal separates as a solid or, in some cases, an oil. The material may be further purified by repeated extractions or crystallization from suitable solvents.

The acetal interchange reaction, whereby the novel acetals of this invention are prepared, may be carried out as follows: A suspension of a synthetic hydroxyl polymer having a plurality of recurring intralinear

groups, e. g., polyvinyl alcohol, and a m-benzoylacetamidobenzaldehyde or an acetal thereof with an alkalnol of one to four carbon atoms or a 1,2- or 1,3-alkanediol of two to four carbon atoms in ethylene glycol or other suitable solvent, e. g., ethanol or methanol, having dissolved therein a small portion of an acidic catalyst is heated with agitation at 60° C. to 80° C. for a period of 0.5 to 25 hours and the resulting polyvinyl acetal is isolated. Isolation of the color-forming polymeric acetal is accomplished by the addition of an ethylene glycol miscible solvent which is not a solvent for the polymeric acetal, followed by filtration and, if desired, by washing with an ethylene glycol miscible solvent which is not a solvent for the polymeric acetal.

In a practical procedure, a suspension of 15 parts of a polyvinyl alcohol and one to six parts of a m-benzoylacetamidobenzaldehyde or its ethylene glycol acetal in 100 parts of ethylene glycol containing one to two parts of phosphoric acid is heated with agitation at 65° C. to 75° C. for 0.5 to 5 hours. The reaction mixture is cooled to 40° C. to 50° C. and 100 to 200 parts of methanol or acetone are added. The resulting polyvinyl acetal color former is separated and slurried with methanol or acetone to free the polymer from the ethylene glycol and to remove traces of unreacted monomeric color former. In order to obtain a polyvinyl acetal whose color and solubility do not change on standing, it is desirable to treat the slurry of the polyvinyl acetal color former with a compound capable of neutralizing the acid catalyst. Suitable compounds for this process include alkoxides, alkali metal hydroxides, bicarbonates and carbonates; ammonia and its mono-, di-, and trialkyl substituted compounds, such as methylamine, dimethylamine, ethylamine, triethylamine, triethanolamine, etc.; heterocyclic bases, such as quinoline, pyridine, etc. The quantity of neutralizing agent added to the suspension should be sufficient to bring the pH to a value of about 6 to 8, preferably 7.5. The acid neutralizing compound may be dissolved in the solvent used during the dilution of the ethylene glycol reaction mixture, or may be added during any of the subsequent slurrying steps.

Other suitable acid catalysts for use in the acetalization of polyvinyl alcohol in ethylene glycol include acids, such as sulfuric acid, hydrochloric acid, and organic acids, such as chloroacetic acid, formic acid, methane sulfonic acid, para-toluenesulfonic acid, etc.

The use of ethylene glycol as a reaction medium is disclosed and claimed in Martin United States application Serial Number 722,961, filed January 18, 1947.

The invention will be further illustrated by the following examples. The parts are by weight.

Example 1

To a solution of 53 parts of m-benzoylacetamidobenzaldehyde ethylene glycol acetal (prepared as described in United States application Serial Number 667,126, filed May 3, 1946), 1000 parts of ethanol, 250 parts of water, and 25 parts of phosphoric acid was added 250 parts of finely divided polyvinyl alcohol (completely hydrolyzed polyvinyl acetate) having a solution viscosity of 18 to 24 centipoises in 4% aqueous solution at 20° C. The resulting slurry was stirred one hour at 80° C. and the reaction mixture was cooled to 60° C. and diluted with 1000 parts of acetone. After cooling to 30° C., the polymeric acetal was collected in a filter and then slurried in methanol containing enough triethylamine to neutralize the residual acid catalyst. The polymeric acetal was again collected on a filter, slurried in fresh methanol, filtered, and finally slurried in two changes of acetone. After drying, the product weighed 260 parts. It was a colorless solid which dissolved in warm 20% aqueous ethanol. Colorimetric analysis showed that the product contained 6.5% by weight of the grouping.

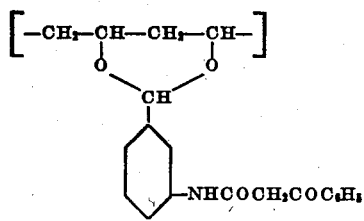

This corresponds to a polyvinyl acetal having 1.8% of the hydroxyls of polyvinyl alcohol acetalized with the color-forming aldehyde.

Example 2

When 10.0 parts of o-sulfobenzaldehyde sodium salt were added to the reaction mixture of Example 1 and the same procedure was followed as in Example 1, 265 parts of polymer were obtained. The polymer which was soluble in warm 10% aqueous ethanol contained 7.5% by weight of the color-forming unit of Example 1 and 4.5% by weight of the grouping

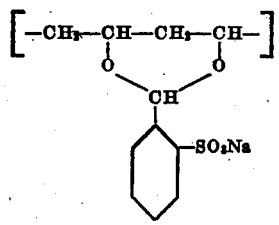

based on the total weight of polymer. This corresponds to a polyvinyl acetal having 2.2% of the hydroxyls of polyvinyl alcohol acetalized with o-sulfobenzaldehyde sodium salt.

Example 3

A mixture of 15.9 parts of m-benzoylacetamidobenzaldehyde ethylene glycol acetal, 4.5 parts of o-sulfobenzaldehyde sodium salt, 500 parts of ethylene glycol, 7.5 parts of 85% phosphoric acid, and 75 parts of a finely divided polyvinyl alcohol (completely hydrolyzed polyvinyl acetate) having 4% aqueous solution viscosity of 18 to 24 centipoises at 20° C. was heated with stirring at 66° C. for 45 minutes. The reaction mixture was cooled to 60° C. and 400 parts of methanol was added with stirring. The solid precipitate was then collected on a filter, neutralized with triethylamine, and then washed thoroughly with methanol and then with acetone. The yield of polyvinyl acetal was 79 parts. The polymer was a colorless solid and dissolved readily in warm 15% aqueous alcohol. Colorimetric analysis showed that the polymer contained 11% by weight of the color-former grouping shown under Example 1 and 6.7% of the solubilizing grouping shown under Example 2, based on the total weight of the polymer. This corresponds to a polyvinyl acetal having 3.4% of hydroxyls of polyvinyl alcohol acetalized with the color former and 3.0% of the hydroxyls acetalized with o-sulfobenzaldehyde sodium salt.

Similar results are obtained by substituting equivalent amounts of m-(p-chlorobenzoylacetamido)benzaldehyde ethylene glycol acetal, m-(m-methoxybenzoylacetamido)benzaldehyde ethylene glycol acetal, m-(p-carbethoxybenzoylacetamido)-benzaldehyde ethylene glycol acetal, and m-(p-carboxybenzoylacetamido)benzaldehyde ethylene glycol acetal which can be prepared by the methods described in McQueen application Serial Number 667,126, filed May 3, 1946, now U. S. Patent 2,464,597. Likewise, certain substituents may be included in the benzaldehyde ring as, for example, in the following compounds: the polyvinyl acetals of 4-methyl-3-(benzoylacetamido)benzaldehyde, 4-methoxy-3-(benzoylacetamido)benzaldehyde.

The polyvinyl acetals of m-benzoylacetamidobenzaldehydes described above are useful as dispersing and protective colloid binding agents for light-sensitive silver salts in a gelatin-free multilayer color film. Color development of an exposed coated film with a primary aromatic color-developing agent, e. g., p-aminodiethylaniline gives a strong, brilliant yellow dye image.

When used as a yellow color former in a gelatin-free multilayer color film, polyvinyl acetals of m-benzoylacetamidobenzaldehyde containing between 5% and 12% by weight of the color-forming nucleus of Example 1 based on the total weight of color-forming polymer are most useful. This corresponds to having the acetal groups on from 1.3% to 3.5% of the hydroxyls of the polyvinyl alcohol. When polymers having lower degrees of substitution are used, the colors formed by color development are weak. When polymers having a higher degree of substitution are used, there is difficulty in obtaining good solutions and in redispersing the emulsion after washing.

In order to achieve more satisfactory water sensitivity for processing when coated on a suitable film base, the color-forming polyvinyl acetals can also contain a number of polymeric units wherein the hydroxyls of the polyvinyl alcohol are acetalized with an aldehydoacid, e. g., ortho-sulfobenzaldehyde, phthalaldehydic acid, glyoxylic acid, and the like or their alkali metal salts. Polymeric acetals having from 0.4% to 5.2% of the hydroxyls of polyvinyl alcohol acetalized with aldehydoacids or their alkali metal salts are suitable. When the preferred o-sulfobenzaldehyde is used, from 0.4 to 3.0% and preferably about 2.4% of the hydroxyls of the polyvinyl alcohol are acetalized with this aldehyde. This range defines a polymer having from 1.3 to 8.0% by weight of a group of the formula

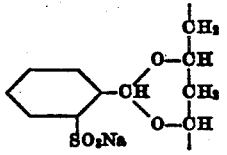

The preferred polyvinyl acetals of this invention have the probable unit structure as follows in the proportions indicated:

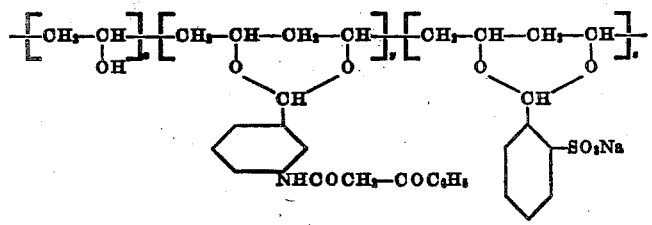

wherein $x$ equals 405 to 428
wherein $y$ equals 3 to 8.3
wherein $z$ equals 0 or 1 to 6.5.

This schematic representation shows only the relative amounts of the groups in the molecule. The color-former unit is not necessarily linked to the solubilizing unit but may be any place in the chain.

The synthetic hydroxyl polymers which can be used in the preparation of the color-forming polyvinyl acetals of this invention include hydroxyl polymers prepared by polymerizing a vinyl ester, e. g., vinyl acetate, vinyl propionate, vinyl benzoate, etc., alone or with minor proportions, i. e., 10% or less, of an unsaturated copolymerizable monomer, followed by partial or complete hydrolysis and, if desired, by further reaction to introduce minor proportions of other modifying groups, e. g., acetal, ester, or ether groups. Such hydroxyl polymers have a linear chain consisting mainly of $-CH_2\overset{|}{C}HOH$ groups. Unmodified polyvinyl alcohol is the preferred hydroxyl polymer for forming the color-forming polyvinyl acetals of this invention.

The m-benzoylacetamidoacetals of polyvinyl alcohol of this invention are superior to the m-acetacetamidoacetals of polyvinyl alcohol as binding agents for silver halides. The silver halide emulsions can be readily dissolved after noodling, whereas silver halide emulsions in m-acetoacetamidoacetals of polyvinyl alcohol show almost no tendency to redissolve after noodling.

As many widely different embodiments of this invention can be made without departing from the spirit and scope thereof, it is to be understood that the invention is not to be limited except as defined by the appended claims.

What is claimed is:

1. Polyvinyl acetals which contain recurring

groups and groups of the formula

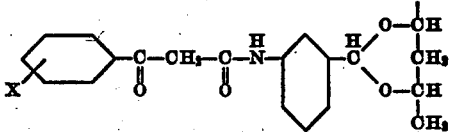

wherein X is taken from the group consisting of hydrogen, chlorine, bromine, methyl, methoxy and $-COOC_2H_5$.

2. Polyvinyl acetals which contain recurring

groups and groups of the formula

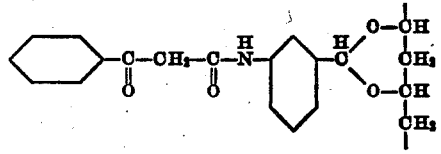

3. Polyvinyl acetals which contain recurring $-CH_2\overset{|}{C}HOH$ groups and from 5% to 12% by weight of the polymer of groups of the formula

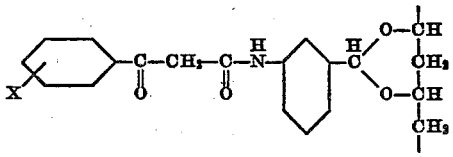

wherein X is taken from the group consisting of hydrogen, chlorine, bromine, methyl, methoxy and $-COOC_2H_5$.

4. Polyvinyl acetals which contain recurring $-CH_2\overset{|}{C}HOH$ groups and from 5% to 12% by weight of the polymer of groups of the formula

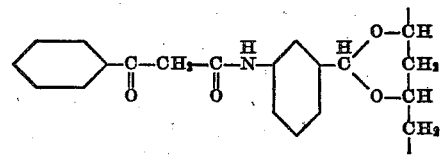

5. Polyvinyl acetals which contain recurring $-CH_2\overset{|}{C}HOH$ groups and from 5% to 12% by weight of the polymer of groups of the formula

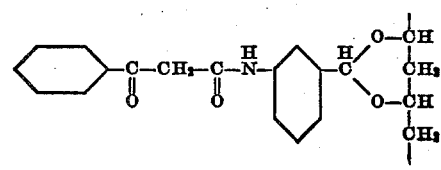

and from 1.3% to 8.0% by weight of the polymer of the groups of the formula
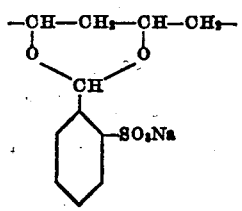
DAVID MALCOLM McQUEEN.
REFERENCES CITED
The following references are of record in the file of this patent:
UNITED STATES PATENTS
| Number | Name | Date |
|---|---|---|
| 1,985,556 | Stusser | Dec. 25, 1934 |
| 2,043,869 | Schmid | June 19, 1936 |
| 2,310,943 | Dorough | Feb. 16, 1943 |
| 2,380,032 | Dorough | July 10, 1945 |
| 2,380,033 | Dorough | July 10, 1945 |
| 2,397,864 | Jennings | Apr. 2, 1946 |